(12) United States Patent
Limerkens et al.

(10) Patent No.: US 8,067,476 B2
(45) Date of Patent: *Nov. 29, 2011

(54) FOAMED THERMOPLASTIC POLYURETHANES

(75) Inventors: Dominicus Limerkens, Meeuwen-Gruitrode (BE); Johan Van Dyck, Meeuwen-Gruitrode (BE); Bart Van Edom, Leuven (BE); Rhona Watson, Huldenberg (BE)

(73) Assignee: Huntsman International LLC, The Woodlands, TX (US)

( * ) Notice: Subject to any disclaimer, the term of this patent is extended or adjusted under 35 U.S.C. 154(b) by 119 days.

This patent is subject to a terminal disclaimer.

(21) Appl. No.: 11/701,204

(22) Filed: Feb. 1, 2007

(65) Prior Publication Data

US 2007/0142486 A1  Jun. 21, 2007

Related U.S. Application Data

(62) Division of application No. 09/890,067, filed as application No. PCT/EP00/00039 on Jan. 5, 2000, now Pat. No. 7,202,284.

(30) Foreign Application Priority Data

Jan. 26, 1999  (EP) .................................... 99101359

(51) Int. Cl.
*C08J 9/32* (2006.01)

(52) U.S. Cl. .............. 521/137; 521/51; 521/56; 521/58; 521/99; 521/113; 521/128; 521/130; 521/170; 521/172; 521/173; 521/174

(58) Field of Classification Search .................... 521/51, 521/56, 58, 99, 113, 128, 130, 137, 170, 521/172, 173, 174; 523/218; 525/457, 458
See application file for complete search history.

(56) References Cited

U.S. PATENT DOCUMENTS

| 5,260,343 A | * | 11/1993 | Harrison et al. | ................. 521/51 |
| 5,272,001 A | | 12/1993 | Weisman | |
| 5,418,257 A | | 5/1995 | Weisman | |
| 5,563,232 A | | 10/1996 | Hurley et al. | |
| 5,583,196 A | * | 12/1996 | Lehmann et al. | ................. 528/49 |
| 6,103,152 A | * | 8/2000 | Gehlsen et al. | ................ 264/45.4 |
| 6,166,109 A | * | 12/2000 | Spitler et al. | .................. 523/218 |
| 7,202,284 B1 | * | 4/2007 | Limerkens et al. | ............ 521/137 |

FOREIGN PATENT DOCUMENTS

| DE | 4015714 A | | 11/1991 |
| EP | 0 029 021 A | | 5/1981 |
| EP | 516024 A | | 12/1992 |
| EP | 0 692 516 | * | 7/1994 |
| JP | 59-108041 | | 2/1984 |
| JP | 11-310619 | | 11/1999 |
| WO | WO 94/20568 A | | 9/1994 |

OTHER PUBLICATIONS

Semerdjiev, Stefan, Thermoplastic Structural Foams. Translated from the Bulgarian. VEB Deutscher Verlag fur Grundstoffindustrie Leipzig, 1980; pp. 3, 16-19.

European Opposition of EP Patent 1 165 674, Applicant : Huntsman International LLC (Appeal No. T 0667/04-3309).

* cited by examiner

*Primary Examiner* — John Cooney
(74) *Attorney, Agent, or Firm* — Robert A. Diaz

(57) ABSTRACT

Process for the preparation of foamed thermoplastic polyurethanes characterised in that the foaming of the thermoplastic polyurethane is carried out in the presence of thermally expandable microspheres.

16 Claims, No Drawings

FOAMED THERMOPLASTIC POLYURETHANES

CROSS REFERENCE TO RELATED APPLICATIONS

This application is a divisional application of U.S. patent application Ser. No. 09/890,067, filed Oct. 30, 2001, which is the National Phase of International Application PCT/EP00/00039 filed Jan. 5, 2000, which designated the U.S. and which claims priority to European Pat. App. No. 99101359.0, filed Jan. 26, 1999, all of which are hereby incorporated in their entirety by reference.

FIELD OF THE INVENTION

The present invention is concerned with a process for the preparation of foamed thermoplastic polyurethanes, novel foamed thermoplastic polyurethanes and reaction systems for preparing foamed thermoplastic polyurethanes.

BACKGROUND OF THE INVENTION

Thermoplastic polyurethanes, herein after referred to as TPUs, are well-known thermoplastic elastomers. In particular, they exhibit very high tensile and tear strength, high flexibility at low temperatures, extremely good abrasion and scratch resistance. They also have a high stability against oil, fats and many solvents, as well as stability against UV radiation and are being employed in a number of end use applications such as the automotive and the footwear industry.

As a result of the increased demand for lighter materials, a low density TPU needs to be developed which, in turn, represents a big technical challenge to provide, at minimum, equal physical properties to conventional low density PU.

It is already known to produce soles and other parts of polyurethane by a polyaddition reaction of liquid reactants resulting in an elastic solid moulded body. Up till now the reactants used were polyisocyanates and polyesters or polyethers containing OH-groups. Foaming was effected by adding a liquid of low boiling point or by means of $CO_2$, thereby obtaining a foam at least partially comprising open cells.

Reducing the weight of the materials by foaming the TPU has not given satisfactory results up to now. Attempts to foam TPU using well-known blowing agents as azodicarbonamides (exothermic) or sodiumhydrocarbonate (endothermic) based products were not successful for mouldings with reduced densities below 800 kg/m$^3$.

With endothermic blowing agents, a good surface finish can be obtained but the lowest density achievable is about 800 kg/m$^3$. Also, the processing is not very consistent and results in long demoulding times. Very little or no foaming is obtained at the mould surface due to a relatively low mould temperature, resulting in a compact, rather thick skin and a coarse cell core.

By using exothermic blowing agents, a lower density foam (down to 750 kg/m$^3$) with very fine cell structure can be achieved but the surface finish is not acceptable for most applications and demould time is even longer.

From the above it is clear that there is a continuous demand for low density TPUs having improved skin quality which can be produced with reduced demould times.

It has now been surprisingly found that foaming TPUs in the presence of thermally expandable microspheres, allows to meet the above objectives. Demould times are significantly reduced and the process can be carried out at lower temperatures, resulting in a better barrel stability. In addition, the use of microspheres even allows to further reduce the density while maintaining or improving the skin quality and demould time.

The present invention thus concerns a process for the preparation of foamed thermoplastic polyurethanes whereby the foaming of the thermoplastic polyurethane is carried out in the presence of thermally expandable microspheres and in the presence of an additional blowing agent, said microspheres containing a hydrocarbon.

The low density thermoplastic polyurethanes thus obtained (density not more than 800 kg/m$^3$) have a fine cell structure, very good surface appearance, a relatively thin skin and show comparable physical properties to conventional PU which renders them suitable for a wide variety of applications.

The invention provides TPU products having outstanding low temperature dynamic flex properties and green strength at the time of demould, at density 800 kg/m$^3$ and below.

The term "green strength", as is known in the art, denotes the basic integrity and strength of the TPU at demould. The polymer skin of a moulded item, for example, a shoe sole and other moulded articles, should possess sufficient tensile strength and elongation and tear strength to survive a 90 to 180 degree bend without exhibiting surface cracks. The prior art processes often require 5 minutes minimum demould time to attain this characteristic.

In addition, the present invention therefore provides a significant improvement in minimum demould time. That is to say, a demould time of 2 to 3 minutes is achievable.

The use of microspheres in a polyurethane foam has been described in EP-A 29021 and U.S. Pat. No. 5,418,257.

Adding blowing agents during the processing of TPUs is widely known, see e.g. WO-A 94/20568, which discloses the production of foamed TPUs, in particular expandable, particulate TPUs, EP-A 516024, which describes the production of foamed sheets from TPU by mixing with a blowing agent and heat-processing in an extruder, and DE-A 4015714, which concerns glass-fibre reinforced TPUs made by injection moulding TPU mixed with a blowing agent.

Nevertheless, none of the prior art documents discloses the use of thermally expandable microspheres to improve the skin quality of foamed low density TPU (density 800 kg/m$^3$ and even below) nor do these documents suggest the benefits associated with the present invention.

DETAILED DESCRIPTION

Thermoplastic polyurethanes are obtainable by reacting a difunctional isocyanate composition with at least one difunctional polyhydroxy compound and optionally a chain extender in such amounts that the isocyanate index is between 90 and 110, preferably between 95 and 105, and most preferably between 98 and 102.

The term 'difunctional' as used herein means that the average functionality of the isocyanate composition and the polyhydroxy compound is about 2.

The term "isocyanate index" as used herein is the ratio of isocyanate-groups over isocyanate-reactive hydrogen atoms present in a formulation, given as a percentage. In other words, the isocyanate index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymer forming process involving the isocyanate ingredient and the isocyanate-reactive ingredients. Any isocyanate groups consumed in a preliminary step to produce modified polyisocyanates (including such isocyanate-derivatives referred to in the art as quasi- or semi-prepolymers) or any active hydrogens reacted with isocyanate to produce modified polyols or polyamines, are not taken into account in the calculation of the isocyanate index. Only the free isocyanate groups and the free isocyanate-reactive hydrogens present at the actual elastomer forming stage are taken into account.

The difunctional isocyanate composition may comprise any aliphatic, cycloaliphatic or aromatic isocyanates. Preferred are isocyanate compositions comprising aromatic diisocyanates and more preferably diphenylmethane diisocyanates.

The polyisocyanate composition used in the process of the present invention may consist essentially of pure 4,4'-diphenylmethane diisocyanate or mixtures of that diisocyanate with one or more other organic polyisocyanates, especially other diphenylmethane diisocyanates, for example the 2,4'-isomer optionally in conjunction with the 2,2'-isomer. The polyisocyanate component may also be an MDI variant derived from a polyisocyanate composition containing at least 95% by weight of 4,4'-diphenylmethane diisocyanate. MDI variants are well known in the art and, for use in accordance with the invention, particularly include liquid products obtained by introducing carbodiimide groups into said polyisocyanate composition and/or by reacting with one or more polyols.

Preferred polyisocyanate compositions are those containing at least 80% by weight of 4,4'-diphenylmethane diisocyanate. More preferably, the 4,4'-diphenylmethane diisocyanate content is at least 90, and most preferably at least 95% by weight.

The difunctional polyhydroxy compound used has a molecular weight of between 500 and 20000 and may be selected from polyesteramides, polythioethers, polycarbonates, polyacetals, polyolefins, polysiloxanes, polybutadienes and, especially, polyesters and polyethers, or mixtures thereof. Other dihydroxy compounds such as hydroxyl-ended styrene block copolymers like SBS, SIS, SEBS or SIBS may be used as well.

Mixtures of two or more compounds of such or other functionalities and in such ratios that the average functionality of the total composition is about 2 may also be used as the difunctional polyhydroxy compound. For polyhydroxy compounds the actual functionality may e.g. be somewhat less than the average functionality of the initiator due to some terminal unsaturation. Therefore, small amounts of trifunctional polyhydroxy compounds may be present as well in order to achieve the desired average functionality of the composition.

Polyether diols which may be used include products obtained by the polymerisation of a cyclic oxide, for example ethylene oxide, propylene oxide, butylene oxide or tetrahydrofuran in the presence; where necessary, of difunctional initiators. Suitable initiator compounds contain 2 active hydrogen atoms and include water, butanediol, ethylene glycol, propylene glycol, diethylene glycol, triethylene glycol, dipropylene glycol, 1,3-propane diol, neopentyl glycol, 1,4-butanediol, 1,5-pentanediol, 1,6-pentanediol and the like. Mixtures of initiators and/or cyclic oxides may be used.

Especially useful polyether diols include polyoxypropylene diols and poly(oxyethylene-oxypropylene) diols obtained by the simultaneous or sequential addition of ethylene or propylene oxides to difunctional initiators as fully described in the prior art. Random copolymers having oxyethylene contents of 10-80%, block copolymers having oxyethylene contents of up to 25% and random/block copolymers having oxyethylene contents of up to 50%, based on the total weight of oxyalkylene units, may be mentioned, in particular those having at least part of the oxyethylene groups at the end of the polymer chain. Other useful polyether diols include polytetramethylene diols obtained by the polymerisation of tetrahydrofuran. Also suitable are polyether diols containing low unsaturation levels (i.e. less than 0.1 milliequivalents per gram diol).

Other diols which may be used comprise dispersions or solutions of addition or condensation polymers in diols of the types described above. Such modified diols, often referred to as 'polymer' diols have been fully described in the prior art and include products obtained by the in situ polymerisation of one or more vinyl monomers, for example styrene and acrylonitrile, in polymeric diols, for example polyether diols, or by the in situ reaction between a polyisocyanate and an amino- and/or hydroxyfunctional compound, such as triethanolamine, in a polymeric diol.

Polyoxyalkylene diols containing from 5 to 50% of dispersed polymer are useful as well. Particle sizes of the dispersed polymer of less than 50 microns are preferred.

Polyester diols which may be used include hydroxyl-terminated reaction products of dihydric alcohols such as ethylene glycol, propylene glycol, diethylene glycol, 1,4-butanediol, neopentyl glycol, 2-methylpropanediol, 3-methylpentane-1,5-diol, 1,6-hexanediol or cyclohexane dimethanol or mixtures of such dihydric alcohols, and dicarboxylic acids or their ester-forming derivatives, for example succinic, glutaric and adipic acids or their dimethyl esters; sebacic acid, phthalic anhydride, tetrachlorophthalic anhydride or dimethyl terephthalate or mixtures thereof.

Polyesteramides may be obtained by the inclusion of aminoalcohols such as ethanolamine in polyesterification mixtures.

Polythioether diols which may be used include products obtained by condensing thiodiglycol either alone or with other glycols, alkylene oxides, dicarboxylic acids, formaldehyde, amino-alcohols or aminocarboxylic acids.

Polycarbonate diols which may be used include those prepared by reacting glycols such as diethylene glycol, triethylene glycol or hexanediol with formaldehyde. Suitable polyacetals may also be prepared by polymerising cyclic acetals.

Suitable polyolefin diols include hydroxy-terminated butadiene homo- and copolymers and suitable polysiloxane diols include polydimethylsiloxane diols.

Suitable difunctional chain extenders include aliphatic diols, such as ethylene glycl, 1,3-propanediol, 1,4-butanediol, 1,5-pentanediol, 1,6-hexanediol, 1,2-propanediol, 2-methylpropanediol, 1,3-butanediol, 2,3-butanediol, 1,3-pentanediol, 1,2-hexanediol, 3-methylpentane-1,5-diol, diethylene glycol, dipropylene glycol and tripropylene glycol, and aminoalcohols such as ethanolamine, N-methyldiethanolamine and the like. 1,4-butanediol is preferred.

The TPUs suitable for processing according to the invention can be produced in the so-called one-shot, semi-prepolymer or prepolymer method, by casting, extrusion or any other process known to the person skilled in the art and are generally supplied as granules or pellets.

Optionally, small amounts, i.e. up to 30, preferably 20 and most preferably 10, wt % based on the total of the blend, of other conventional thermoplastic elastomers such as PVC, EVA or TR may be blended with the TPU.

Any thermally expandable microspheres can be used in the present invention. However, microspheres containing hydrocarbons, in particular aliphatic or cycloaliphatic hydrocarbons, are preferred.

The term "hydrocarbon" as used herein is intended to include non-halogenated and partially or fully halogenated hydrocarbons.

Thermally expandable microspheres containing a (cyclo) aliphatic hydrocarbon, which are particularly preferred in the present invention, are commercially available. Such microspheres are generally dry, unexpanded or partially unexpanded microspheres consisting of small spherical particles with an average diameter of typically 10 to 15 micron. The sphere is formed of a gas proof polymeric shell (consisting e.g. of acrylonitrile or PVDC), encapsulating a minute drop of a (cyclo)aliphatic hydrocarbon, e.g. liquid isobutane. When these microspheres are subjected to heat at an elevated temperature level (e.g. 150° C. to 200° C.) sufficient to soften the thermoplastic shell and to volatilize the (cyclo)aliphatic hydrocarbon encapsulated therein, the resultant gas expands the shell and increases the volume of the microspheres. When expanded, the microspheres have a diameter 3.5 to 4 times their original diameter as a consequence of which their expanded volume is about 50 to 60 times greater than their initial volume in the unexpanded state. An example of such microspheres are the EXPANCEL-DU microspheres which are marketed by AKZO Nobel Industries of Sweden ('EXPANCEL' is a trademark of AKZO Nobel Industries).

A blowing agent is added to the system, which may either be an exothermic or endothermic blowing agent, or a combination of both. Most preferably however, an endothermic blowing agent is added.

Any known blowing agent used in the preparation of foamed thermoplastics may be used in the present invention as blowing agents.

Examples of suitable chemical blowing agents include gaseous compounds such as nitrogen or carbon dioxide, gas (e.g. $CO_2$) forming compounds such as azodicarbonamides, carbonates, bicarbonates, citrates, nitrates, borohydrides, carbides such as alkaline earth and alkali metal carbonates and bicarbonates e.g. sodium bicarbonate and sodium carbonate, ammonium carbonate, diaminodiphenylsulphone, hydrazides, malonic acid, citric acid, sodium monocitrate, ureas, azodicarbonic methyl ester, diazabicylooctane and acid/carbonate mixtures. Preferred endothermic blowing agents comprise bicarbonates or citrates.

Examples of suitable physical blowing agents include volatile liquids such as chlorofluorocarbons, partially halogenated hydrocarbons or non-halogenated hydrocarbons like propane, n-butane, isobutane, n-pentane, isopentane and/or neopentane.

Preferred endothermic blowing agents are the so-called 'HYDROCEROL' blowing agents as disclosed in a.o. EP-A 158212 and EP-A 211250, which are known as such and commercially available ('HYDROCEROL' is a trademark of Clariant).

Azodicarbonamide type blowing agents are preferred as exothermic blowing agents.

Microspheres are usually used in amount of from 0.1 to 5.0 parts by weight per 100 parts by weight of thermoplastic polyurethane. From 0.5 to 4.0 parts by weight per 100 parts by weight of thermoplastic polyurethane of microspheres are preferred. Most preferably, microspheres are added in amounts from 1.0 to 3.0 parts by weight per 100 parts by weight of thermoplastic polyurethane.

The total amount of blowing agent added is usually from 0.1 to 5.0 parts by weight per 100 parts by weight of thermoplastic polyurethane. Preferably, from 0.5 to 4.0 parts by weight per 100 parts by weight of thermoplastic polyurethane of blowing agent is added. Most preferably, blowing agent is added in amounts from 1.0 to 3.0 parts by weight per 100 parts by weight of thermoplastic polyurethane.

Additives which are conventionally used in thermoplastics processing may also be used in the process of the present invention. Such additives include catalysts, for example tertiary amines and tin compounds, surface-active agents and foam stabilisers, for example siloxane-oxyalkylene copolymers, flame retardants, antistatic agents, plasticizers, organic and inorganic fillers, pigments and internal mould release agents.

The foamed thermoplastic polyurethanes of the present invention can be made via a variety of processing techniques, such as extrusion, calendering, thermoforming, flow moulding or injection moulding. Injection moulding is however the preferred production method. The presence of thermally expandable microspheres allows for a reduction in processing temperatures. Typically the process of the present invention is carried out at temperatures between 150 and 175° C.

Advantageously, the mould is pressurised, preferably with air, and the pressure is released during foaming. Although such process is known and commonly available from several machine producers, it has been surprisingly found that conducting the process of the present invention in a pressurised mould results in TPU articles having an excellent surface finish and physical properties, while having an even further reduced density (down to 350 kg/m$^3$).

Thermoplastic polyurethanes of any density between about 100 and 1200 kg/m$^3$ can be prepared by the method of this invention, but it is primarily of use for preparing foamed thermoplastic polyurethanes having densities of less than 800 kg/m$^3$, more preferably less than 700 kg/m$^3$ and most preferably less than 600 kg/m$^3$.

The thermoplastic polyurethane is customarily manufactured as pellets for later processing into the desired article. The term 'pellets' is understood and used herein to encompass various geometric forms, such as squares, trapezoids, cylinders, lenticular shapes, cylinders with diagonal faces, chunks, and substantially spherical shapes including a particle of powder or a larger-size sphere. While thermoplastic polyurethanes are often sold as pellets, the polyurethane could be in any shape or size suitable for use in the equipment used to form the final article.

According to another embodiment of the present invention, the thermoplastic polyurethane pellet of the present invention comprises a thermoplastic polyurethane body, the thermally expandable microspheres and a binding agent which binds the body and the microspheres. The binding agent comprises a polymeric component that has an onset temperature for its melt processing lower than the onset temperature of the melt processing range of the TPU. The pellets may also include blowing agents and/or additive components such as colorant or pigments.

The binding agent covers at least part of the thermoplastic polyurethane body. In a preferred embodiment, the thermoplastic polyurethane body and microspheres are substantially encapsulated by the binding agent. By 'substantially encapsulated' we mean that at least three-quarters of the surface of the thermoplastic polyurethane body is coated, and preferably at least about nine-tenths of the resin body is coated. It is particularly preferred for the binding agent to cover substantially all of the polyurethane body and microspheres. The amount of binding agent to the thermoplastic polyurethane may typically range from at least about 0.1% by weight and up to about 10% by weight, based on the weight of the thermoplastic polyurethane pellet. Preferably, the amount of the binding agent is at least about 0.5% by weight and up to 5% by weight, based on the weight of the thermoplastic polyurethane pellet.

Preferably, the binding agent has an onset temperature for its melt processing range that is below the onset temperature of the melt processing range of the thermoplastic polyurethane body. Thus the binding agent may be applied as a melt to the thermoplastic polyurethane body composition while the latter is a solid or substantially a solid. The onset temperature of the melt processing, range of the binding agent is preferably above about 20 degree C., and more preferably it is above 60 degree C., and even more preferably it is at least about 80 degree C. The onset temperature of the melt processing range of the polymeric component of the coating preferably has an onset temperature for its melt processing range at least about 20 degree C. and even more preferably at least about 40 degree C. below, the onset temperature for the melt processing range of the thermoplastic polyurethane body. If the customized thermoplastic polyurethane pellets are to be dried using a dryer, then the melt processing range of the binding agent is preferably above the temperature of the dryer. In a preferred embodiment, the binding agent is chosen to prevent or slow water absorption so that a drying step before forming the desired article is unnecessary.

The binding agent may then be added to the TPU pellets by several different methods. In one method, the pellets are placed in a container with the coating composition while the pellets are still at a temperature above the onset temperature of the melt processing range of the binding agent. In this case the binding agent may be already melted or may be melted by the heat of the pellets or by heat applied externally to the container. For example, without limitation, the binding agent may be introduced to the container as a powder when it is to be melted in the container. The binding agent can be any substance capable of binding the thermoplastic polyurethane body and the microspheres. Preferably the binding agent comprises a polymeric component. Examples of suitable polymeric components include polyisocyanates and/or prepolymers thereof.

The foamed thermoplastic polyurethanes obtainable via the process of the present invention are particularly suitable for use in any application of thermoplastic rubbers including, for example, footwear or integral skin applications like steering wheels.

Customized thermoplastic polyurethanes may be produced more efficiently using the process according to the present invention. The customized thermoplastic polyurethanes may be formed into any of the articles generally made with thermoplastic resins. Examples of articles are interior and exterior parts of automobiles, such as inside panels, bumpers, housing of electric devices such as television, personal computers, telephones, video cameras, watches, note-book personal computers; packaging materials; leisure goods; sporting goods and toys In another embodiment, the present invention concerns a reaction system comprising (a) a TPU and (b) thermally expandable microspheres.

The invention is illustrated, but not limited, by the following examples in which all parts, percentages and ratios are by weight.

EXAMPLES

Example 1

Comparative

TPU pellets (Avalon 62AEP; 'Avalon' is a trademark of Imperial Chemical Industries Ltd.) were dry blended with an endothermic blowing agent (1% NC175 powder or 2% INC7175ACR (which is a masterbatch equivalent); both supplied by Tramaco GmbH).

The dry blend was then processed on an injection moulding machine (Desma SPE 231) to form a test moulding of dimensions 19.5*12.0*1 cm.

The processing temperatures for all the examples can be seen on Table 1. The physical properties obtained for all the examples can be seen on Table 2. Abrasion was measured according to DIN53516.

Example 2

Comparative

The TPU of example 1 was dry blended with an exothermic blowing agent (Celogen AZNP130; available from Uniroyal) and was processed in the same way as in Example 1.

The minimum achievable density to avoid severe surface marking is 1000 kg/m$^3$ with an addition level of 0.3%.

Example 3

Comparative

The TPU of example 1 was dry blended with a mixture of an exothermic and an endothermic blowing agent (0.3% Celogen AZNP130 and 0.7% NC175) and processed in the same way as Example 1.

Example 4

Comparative

The TPU of example 1 was dry blended with 4% of thermally expandable microspheres (Expancel 092 MB 120; commercially available from Akzo Nobel). This blend was processed in the same way as Example 1.

Example 5

The TPU of example 1 was dry blended with 2% of thermally expandable microspheres (Expancel 092 MB120) and an endothermic blowing agent (1% NC175 or 2% INC7175ACR) and processed in the same way as Example 1.

Example 6

The TPU of example 1 was dry blended with 2% of thermally expandable microspheres (Expancel 092 MB120) and 1% of an exothermic blowing agent (Celogen AZNP130). Again this was processed in the same way as Example 1.

Example 7

The TPU of example 1 was dry blended with 2% of thermally expandable microspheres (Expancel 092 MB120), 0.7% of an endothermic blowing agent (NC175) and 0.3% of an exothermic blowing agent (Celogen AZNP130). Again this was processed in the same way as Example 1.

Example 8

The TPU of example 1 was dry blended with 2% of thermally expandable microspheres (Expancel 092 MB120) and an endothermic blowing agent (1% NC175 or 2% INC7175ACR). This was processed on a Main Group injection moulding machine.

Example 9

The TPU of example 1 was dry blended with 2.0% of thermally expandable microspheres (Expancel 092 MB120) and 2% of an exothermic blowing agent (IM7200; commercially available from Tramaco GmbH). This dry blend was processed on a Main Group machine with an air injection system (Simplex S16).

Example 10

The TPU of example 1 was dry blended with 2.5% of thermally expandable microspheres (EXP 092 MB120) and 2% of an exothermic blowing agent (IM7200). This dry blend was processed on a Main Group machine with an air injection system (Simplex S16).

TABLE 1

Processing Temperatures of Injection Moulding

|  | Zone 1 | Zone 2 | Zone 3 | Nozzle | Mould Temp.(C.) |
|---|---|---|---|---|---|
| Ex. 1* | 180 | 185 | 190 | 185 | 50 |
| Ex. 2* | 175 | 180 | 185 | 180 | 50 |
| Ex. 3* | 180 | 185 | 190 | 185 | 50 |
| Ex. 4 | 155 | 160 | 165 | 160 | 50 |
| Ex. 5 | 160 | 165 | 170 | 165 | 50 |
| Ex. 6 | 160 | 165 | 170 | 165 | 50 |
| Ex. 7 | 160 | 165 | 170 | 165 | 50 |
| Ex. 8 | 155 | 160 | 165 | 160 | 40 |
| Ex. 9 | 155 | 160 | 165 | 160 | 25 |
| Ex. 10 | 155 | 160 | 165 | 160 | 25 |

*comparative example

TABLE 2

Properties

|  | Density ($kg/m^3$) | Hardness (Shore A) | Abrasion (mg) | Flex. Resistance (No. of cycles) | Demould time (seconds) | Skin Appearance |
|---|---|---|---|---|---|---|
| Ex. 1* | 810 | 61 | 53 | >100.000 | 180 | Excellent |
| Ex. 2* | 750 | 61 | 70 | >100.000 | 210 | Bad |
| Ex. 3* | 800 | 61 | 60 | >100.000 | 180 | Good |
| Ex. 4 | 800 | 68 | 120 | >100.000 | 120 | Excellent |
| Ex. 5 | 700 | 58 | 105 | >100.000 | 130 | Excellent |
| Ex. 6 | 670 | 57 | 130 | >100.000 | 150 | Good |
| Ex. 7 | 700 | 58 | 110 | >100.000 | 130 | Excellent |
| Ex. 8 | 550 | 51 | 125 | >100.000 | 180 | Excellent |
| Ex. 9 | 450 | 46 | 105 | >100.000 | 180 | Excellent |
| Ex. 10 | 350 | 40 | 125 | >100.000 | 180 | Excellent |

*comparative example

Example 11

Example 11 provides for TPU pellets comprising microspheres formulated with binding agent. TPU pellets were pre-heated in a hot air oven at 100° C. Then as a binding agent, an isocyanate prepolymer based on Daltorez® P321 and Suprasec® MPR is prepared at 80° C. The binding agent (1-2% by weight) is then mixed into the TPU pellets to fully wet the surface of the TPU. The additives are then added and mixing continues until a homogeneous distribution of the additives on the surface of the TPU pellets is achieved. This mixture is then discharged into a polythene container and cooled to 10° C. to allow the coating to solidify. This 'cake' is then de-agglomerated by hand and is ready for use in the injection molding machine.

These coated pellets were processed on the injection molding machine and successfully blown to densities of 0.73 g/cc.

Daltorez® P321 is a polyester based polyol based on adipic acid and 1,6 hexanediol Suprasec® MPR is pure MDI

The invention claimed is:

1. A process for preparing a foamed thermoplastic polyurethane material having a density between 100 and 800 $kg/m^3$ wherein the foaming of the thermoplastic polyurethane is carried out by an injection molding process comprising injecting a thermoplastic polyurethane pellet, a thermally expandable microsphere, an additional blowing agent, and a binding agent into a mould; and heating the contents of the mould to form the polyurethane material; wherein said thermally expandable microsphere comprises a hydrocarbon, and wherein the binding agent comprises a polymeric component that has a melt processing onset temperature range that is below the melt processing onset temperature range of the thermoplastic polyurethane pellet.

2. Process according to claim 1 wherein the hydrocarbon is an aliphatic or cycloaliphatic hydrocarbon.

3. Process according to claim 1 wherein the additional blowing agent comprises an endothermic blowing agent is present.

4. Process according to claim 1 wherein the additional blowing agent comprises an exothermic blowing agent is present.

5. Process according to claim 3 wherein the endothermic blowing agent comprises bicarbonates or citrates.

6. Process according to claim 4 wherein the exothermic blowing agent comprises azodicarbonamide type compounds.

7. Process according to claim 1 wherein the aromatic difunctional isocyanate comprises diphenylmethane diisocyanate.

8. Process according to claim 7 wherein the diphenylmethane diisocyanate comprises at least 80% by weight of 4,4'-diphenylmethane diisocyanate.

9. Process according to claim 7 wherein a difunctional polyhydroxy compound comprising a polyoxyalkylene diol or polyester diol is used.

10. Process-according to claim 9 wherein the polyoxyalkylene diol comprises oxyethylene groups.

11. Process according to claim 10 wherein the polyoxyalkylene diol is a poly(oxyethylene-oxypropylene) diol.

12. Process according to claim 1 wherein the amount of microspheres is between 1.0 and 3.0 parts by weight per 100 parts by weight of thermoplastic polyurethane.

13. Process according to claim 1 wherein the amount of blowing agent is between 1.0 and 3.0 parts by weight per 100 parts by weight of thermoplastic polyurethane.

14. Process for the preparation of foamed thermoplastic polyurethanes having a density between 100 and 800 kg/m$^3$, comprising:

injecting into a pressured injection mold a mixture comprising: (i) a thermoplastic polyurethane, (ii) a thermally expandable microsphere, and (iii) an additional blowing agent, and (iv) a binding agent; wherein component (i) is a the reaction product of a difunctional isocyanate composition comprising an aromatic difunctional isocyanate compound; and wherein the binding agent comprises a polymeric component that has a melt processing onset temperature range that is below the melt processing onset temperature range of component (i); and processing the mixture at a temperature between 150° C. and 175° C.;

wherein the amount of component (ii) is between 0.5 and 4.0 parts by weight per 100 parts by weight of component (i) and wherein the amount of component (iii) is between 0.5 and 4.0 parts by weight per 100 parts by weight of component (i).

15. The process according to claim 1, wherein the polymeric component comprises a polyisocyanate, a polyisocyanate prepolymer, or combinations thereof.

16. The process according to claim 14, wherein the polymeric component comprises a polyisocyanate, a polyisocyanate prepolymer, or combinations thereof.

* * * * *